(12) United States Patent
Toutoungi

(10) Patent No.: US 8,622,554 B1
(45) Date of Patent: Jan. 7, 2014

(54) PORTABLE WEATHER-RESISTANT UNIT FOR VIDEO PROJECTORS

(75) Inventor: Nick Toutoungi, Plantation, FL (US)

(73) Assignee: Twilight Features, Inc., Plantation, FL (US)

( * ) Notice: Subject to any disclaimer, the term of this patent is extended or adjusted under 35 U.S.C. 154(b) by 316 days.

(21) Appl. No.: 13/116,040

(22) Filed: May 26, 2011

(51) Int. Cl.
*G03B 21/14* (2006.01)

(52) U.S. Cl.
USPC .......................................... 353/119; 348/794

(58) Field of Classification Search
USPC ....................................................... 353/119
See application file for complete search history.

(56) References Cited

U.S. PATENT DOCUMENTS

| | | | | |
|---|---|---|---|---|
| 4,863,275 A | * | 9/1989 | Cormack et al. | 356/612 |
| 6,505,940 B1 | * | 1/2003 | Gotham et al. | 353/119 |
| 6,966,651 B2 | * | 11/2005 | Johnson | 353/15 |
| 7,025,466 B2 | * | 4/2006 | Hoffmeister et al. | 353/119 |
| 7,052,136 B2 | * | 5/2006 | Johnson | 353/15 |
| 7,320,520 B2 | * | 1/2008 | Johnson | 353/15 |
| 7,887,190 B2 | * | 2/2011 | Van Avery et al. | 353/28 |
| 7,887,191 B2 | * | 2/2011 | Dill et al. | 353/28 |
| 2004/0036845 A1 | * | 2/2004 | Hoffmeister et al. | 353/79 |
| 2005/0083486 A1 | * | 4/2005 | Johnson | 353/15 |
| 2006/0001835 A1 | * | 1/2006 | Johnson | 353/15 |
| 2006/0192927 A1 | * | 8/2006 | Ikeuchi et al. | 353/119 |
| 2006/0227291 A1 | * | 10/2006 | Johnson | 353/15 |
| 2007/0201005 A1 | * | 8/2007 | Rhodes et al. | 353/30 |
| 2009/0195753 A1 | * | 8/2009 | Dill et al. | 353/28 |
| 2009/0195759 A1 | * | 8/2009 | Van Avery et al. | 353/119 |
| 2010/0128229 A1 | | 5/2010 | Laboris | |

OTHER PUBLICATIONS

RDY2GO by Video Furniture International, http://www.rdy2go.com, dated May 9, 2006.*
AV Rover Portable AV Systems Brochure (http://www.avrover.com/cmsdocuments/AVRovercatalog09.pdf).
CineBox Home Backyard Theater System (http://openaircinema.us/media/Brochures/CineBox%20Home%20Brochure.pdf) (p. 3).
Epson MovieMate (http://www.epson.com/cmc_upload/0/000/171/553/MM62_ProdSpecs.pdf) (pp. 3-4).

* cited by examiner

*Primary Examiner* — Francis M Legasse, Jr.
*Assistant Examiner* — Bao-Luan Le

(57) ABSTRACT

A portable weather-resistant device is provided for use with a video projector that includes front and back projector windows with interchangeable clear and dark plates, leveling feet, and wheels. The device can be configured to house a weatherproof DVD player, speakers, a radio, ventilation fans, projector mount, projector plate, AC to DC converter, and microphone input.

4 Claims, 5 Drawing Sheets

US 8,622,554 B1

PORTABLE WEATHER-RESISTANT UNIT FOR VIDEO PROJECTORS

CROSS-REFERENCE TO RELATED APPLICATIONS

None.

STATEMENT REGARDING FEDERALLY SPONSORED RESEARCH OR DEVELOPMENT

Not applicable.

FIELD OF THE INVENTION

The invention relates to accessories for audio/visual devices, in particular accessories for furthering portability and suitability for outdoor use of audio/visual devices.

BACKGROUND OF THE INVENTION

The use of audio/visual devices in outdoor environments for entertainment and educational or instructional purposes has been increasing. Projectors can be used with portable or temporary projection screens to allow video to be shown almost anywhere. There are also a number of options for including a sound system, microphone system, and power converter with projectors. However, these components have not been fitted into a single compact, portable, adjustable, weather-resistant casing. There is a need for a weather-resistant, portable device that can be used to conveniently house and transport video projectors along with other audio/visual devices.

SUMMARY OF THE INVENTION

It is an object of the invention to provide a housing that can accommodate a projector and accessories for projectors while being portable and weather-resistant.

It is a further object of the invention that the housing include speakers in the front and have front and back projector windows with interchangeable clear and dark plates.

It is a further object of the invention that the housing include a retractable handle, wheels, and a leveling mechanism.

It is a further object of the invention that the housing include a power converter, a radio, a DVD player, a microphone input, ventilation fans and/or a projector mount.

DETAILED DESCRIPTION OF PREFERRED EMBODIMENTS

Figure 1:
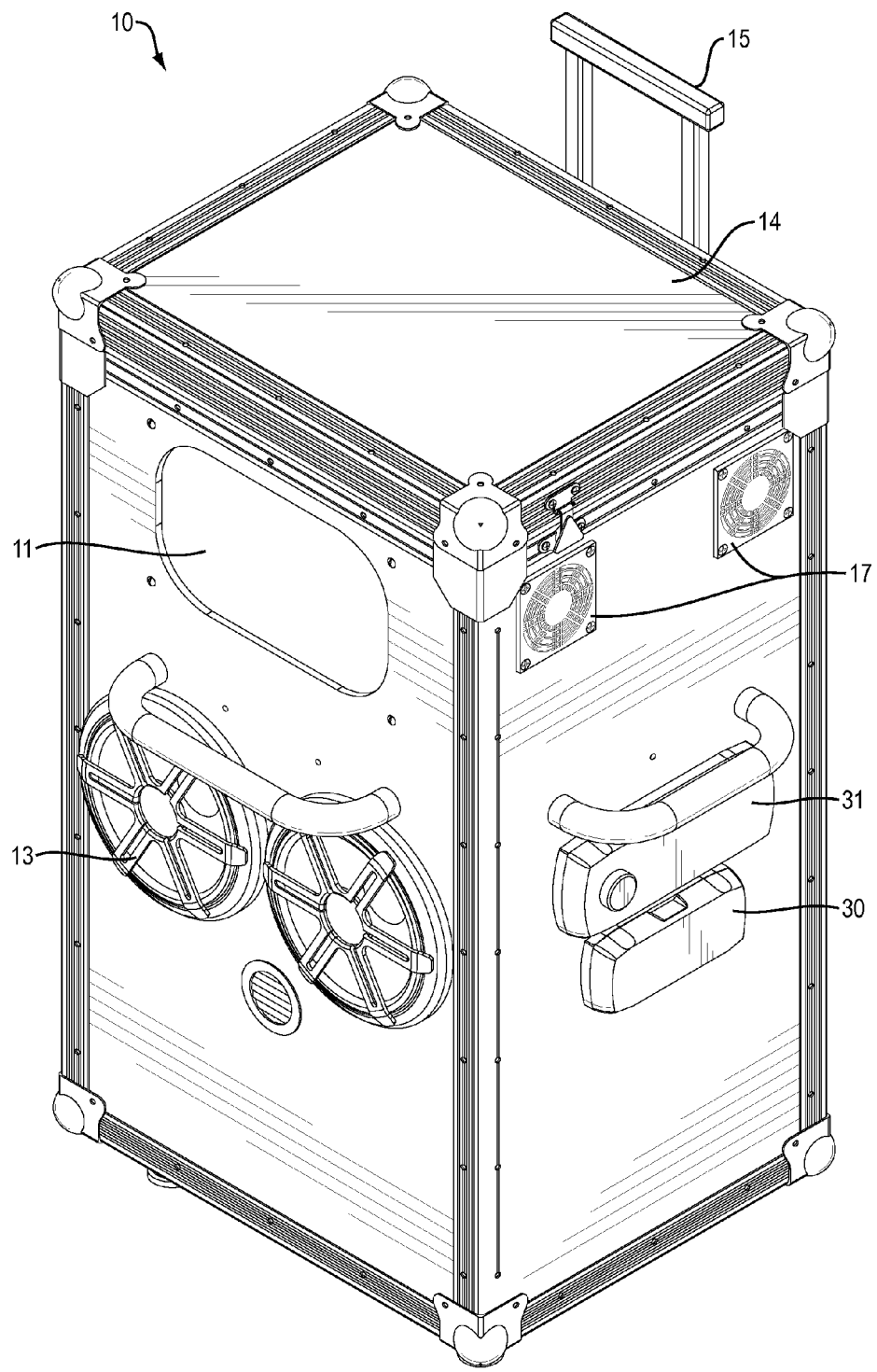
FIG. 1 depicts a perspective view showing front and a side of an embodiment of a device of the present invention.
Figure 2:
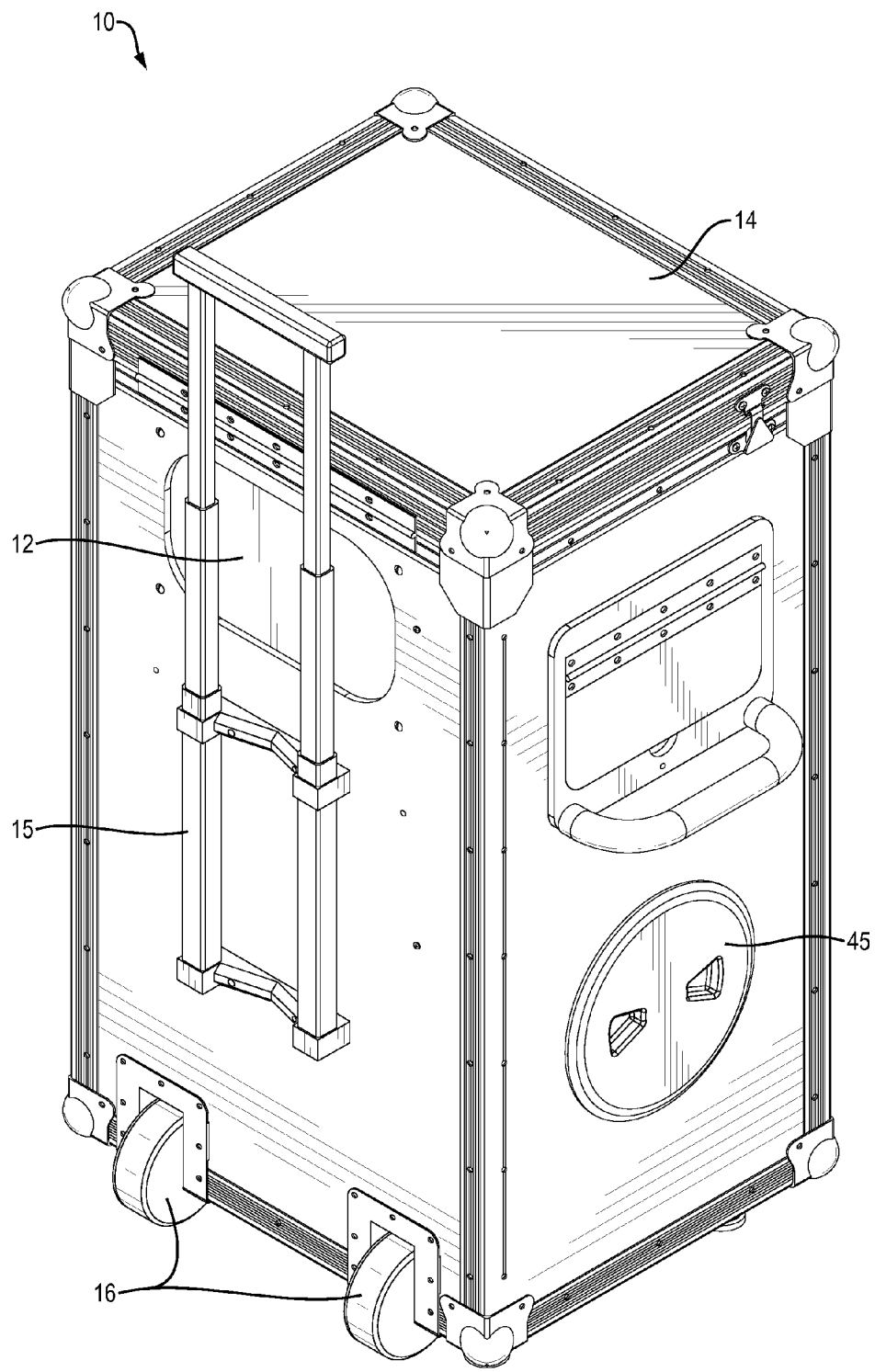
FIG. 2 depicts a perspective view showing back and a side of an embodiment of a device of the present invention.

A compact, portable accessory unit 10 for projectors is shown in FIGS. 1-2. The unit 10 is weather-resistant so that it can be used in outdoor environments and the audio/visual equipment associated with the unit can be used as well. All sides of the unit 10 are riveted together with blind rivets for water protection.

The front of unit 10 includes speakers 13. Preferably, the speakers 13 are weather resistant marine speakers. Unit 10 also includes a front projector window 11 and a rear projector window 12. A projector can be placed in the unit 10 by removing or opening the top panel 14 and the projector can be oriented to project through either the front or rear projection window. This feature allows the speakers 13 to be oriented toward the viewing audience regardless of whether a front projector or rear projector is used. When a projector is to be located behind a viewing screen, the projector is oriented to project through the front projector window 11. When the projector is to be used from the front of a viewing screen, the projector is oriented to project through the rear projector window 12 so that the speakers 13 face the audience. In a preferred embodiment, the plates for the windows are removable and interchangeable. One of the plates can be dark and one of the plates can be clear so that the interior of the unit 10 can be less visible through the window that is not being used for projection. Side windows (not shown) can also be included.

The portable unit 10 also includes an extendable handle 15 attached to the rear and wheels 16 on the bottom for ease of transport. The handle 15 is either positioned such that it does not interfere with the rear projection window 12 or collapsible so that it will not interfere with the rear projection window 12 when a projector is in use.

Figure 5:
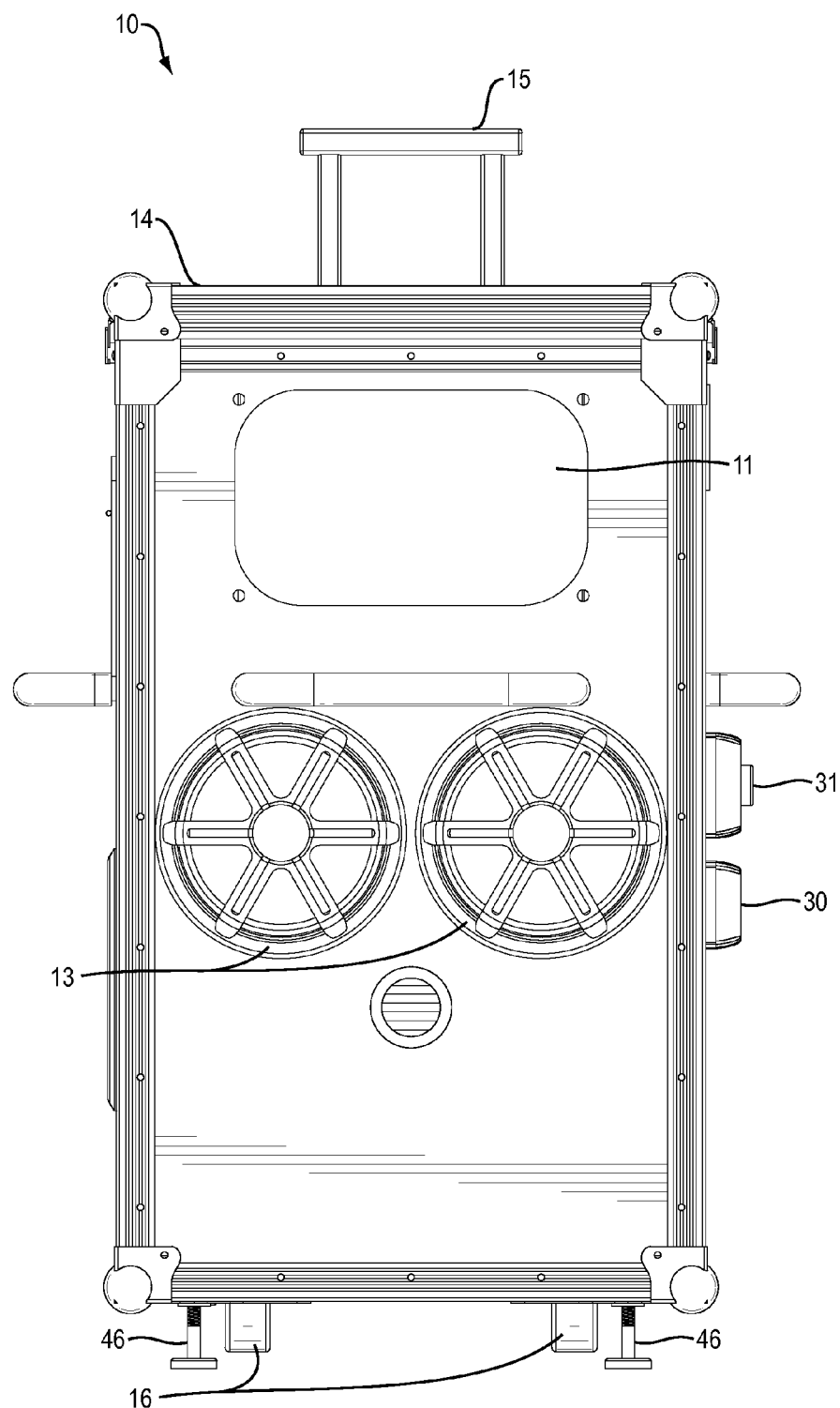
FIG. 5 shows the front of an embodiment of a device of the present invention.

The bottom of the unit 10 may also include a leveling mechanism such as the feet 46 shown in FIG. 5. The leveling mechanism allows the unit 10 to be set up on uneven terrain as can be encountered in outdoor environments.

To operate in the substantially enclosed, weather-resistant unit 10, electronic devices require air circulation for cooling. Therefore, ventilating fans 17 are included. Preferably, two 12-volt DC fans are used. Most projectors will include a cooling fan to cool the light source. However, when a projector is placed within the weather-resistant unit with the top panel closed, additional ventilation is required for normal functioning.

Power is provided for the electronic devices through an AC to DC converter. Preferably, a 120 volt AC to 12 volt DC converter is used. Outlets are provided within the unit 10. A retractable extension cord can also be included.

Figure 3:
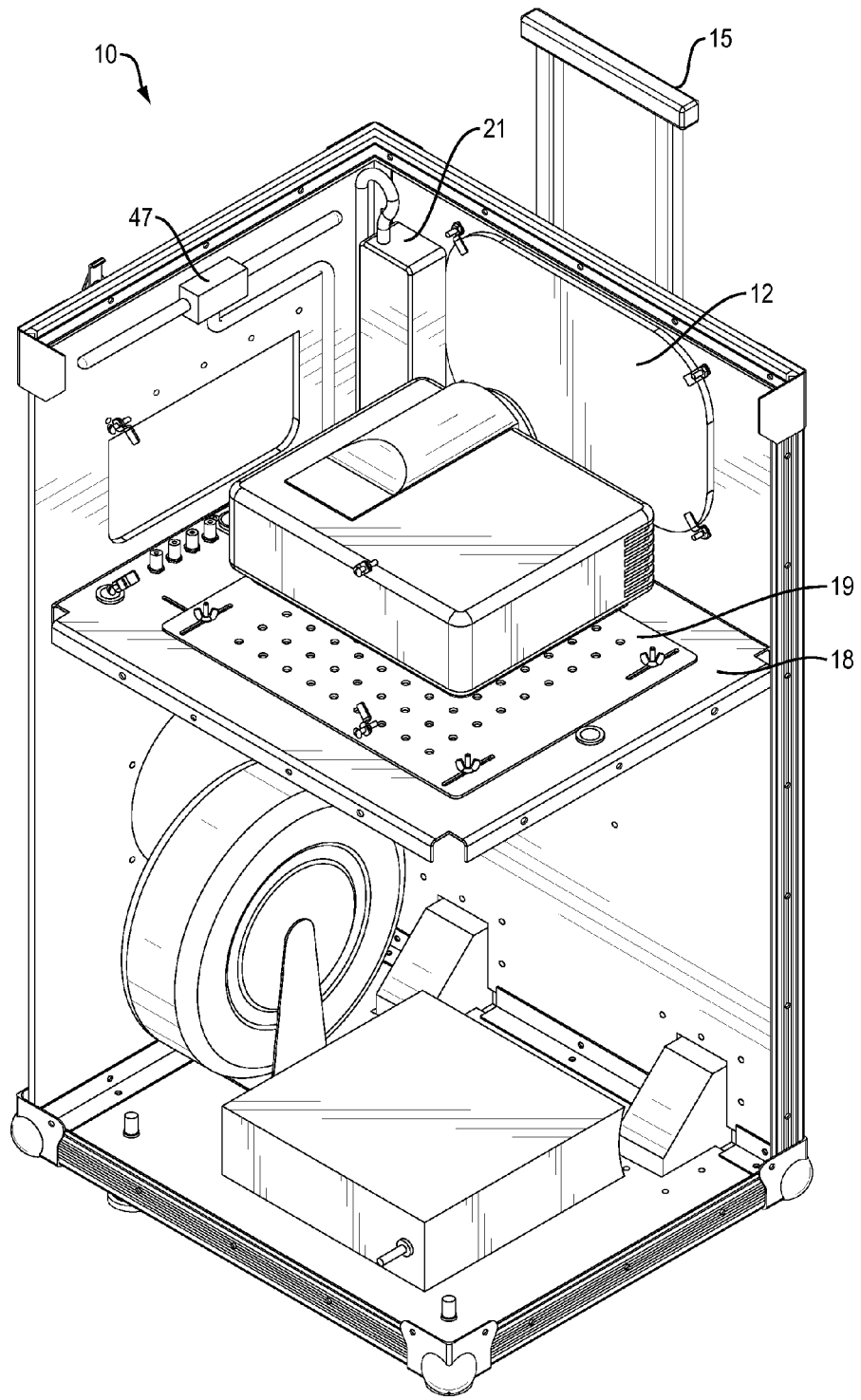
FIG. 3 is a cut-away view of an embodiment of the present invention in which the top, front panel and a side panel are not shown.
Figure 4:
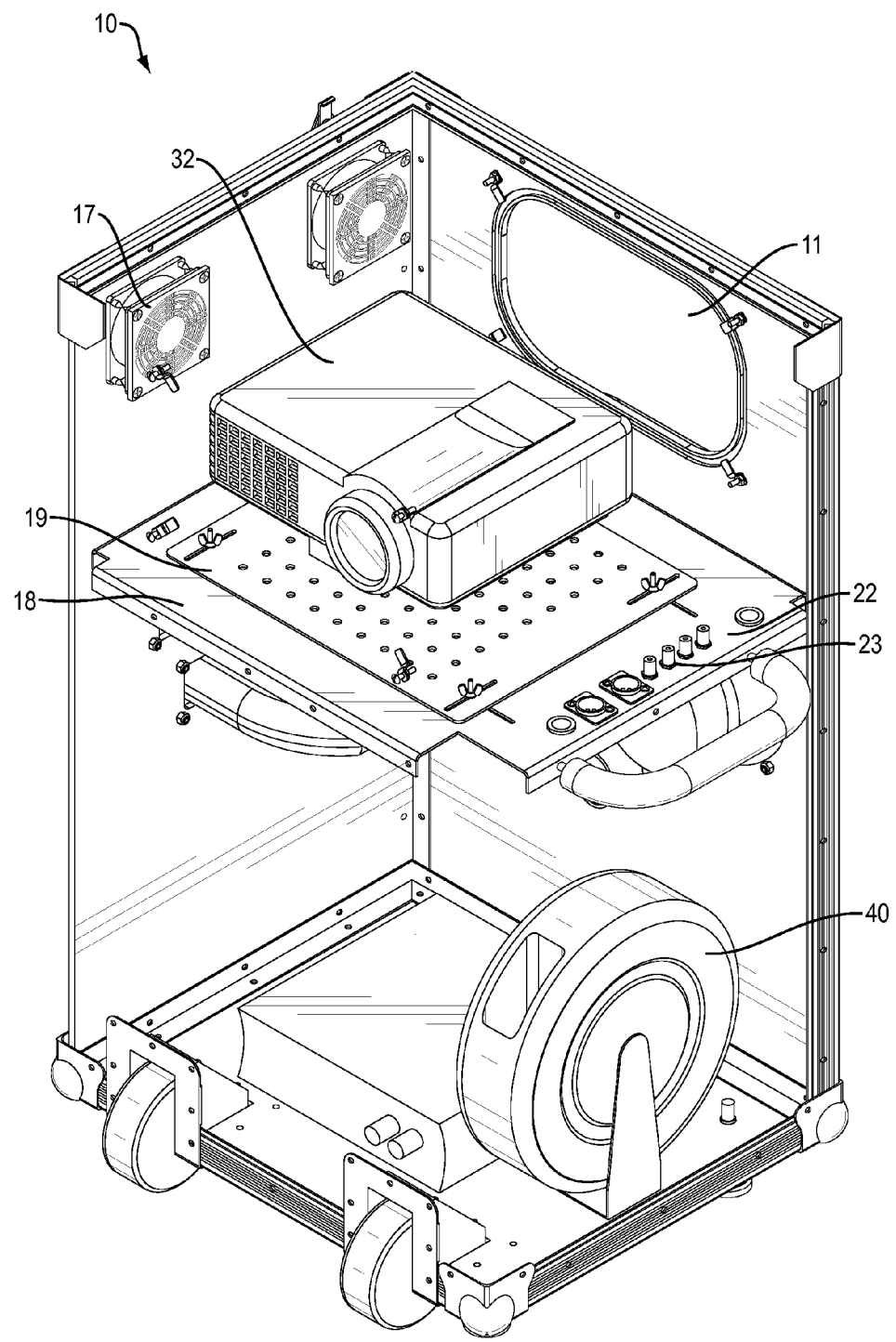
FIG. 4 is a cut-away view of an embodiment of the present invention in which the top, rear panel and a side panel are not shown.

As shown in FIGS. 3 and 4, the upper portion of the interior of unit 10 can include a shelf 18 with a projector plate 19. The projector 32 shown in FIGS. 3 and 4 is oriented to project through rear window 12. A projector mount, which allows the projector to be tilted as needed, can be included to attach the projector 32 to the projector plate 19. Preferably, a power strip 21 is also included along with audio inputs 22 and line outputs 23 for connecting to any external speakers. In addition, an antenna 47 can be included.

Beneath the shelf 18, the lower portion of the interior of unit 10 can house a power strip (not shown) and a retractable extension cord 40. Other accessories (not shown) can be housed in this area including a DVD player, preferably a marine grade waterproof DVD player, a radio, a microphone input for a public address system, and/or a portable media player dock. An access hatch 30 (shown in FIG. 1) or a port-hole 45 (shown in FIG. 2) can also be included to provide easier access to these accessories.

A control panel 31 is provided on a side of unit 10 which allows a user to control various accessories, including a DVD player, the radio, speaker volume, and microphone parameters.

The invention claimed is:

1. A portable weather-resistant device comprising: a weather-resistant exterior including a top panel, a bottom, a front panel, a rear panel and side panels, wherein the bottom, side panels, front panel and rear panel are riveted together with blind rivets and leveling feet are attached to the bottom; wheels attached to the bottom; a retractable handle attached to the rear panel; a window in the front panel and a window in the rear panel; a ventilation fan in an upper portion of the device; audio speakers positioned in the front panel; an access hatch in a side panel; a power inverter; a projector plate and a projector mount situated such that a projector can be oriented to project through the window in the front panel or the window in the rear panel; a DVD player, an FM radio, and a music player within the device; a glass plate for the window in the front panel and a glass plate for the window in the rear panel wherein one of the glass plates is clear and one of the glass plates is opaque and each of the glass plates can fit in either the front window or the rear window; and a retractable power cord that fits within the device when coiled.

2. The device of claim 1 wherein the DVD player is a weather resistant marine DVD player.

3. The device of claim 1 wherein the power inverter is a 120 volt AC to 12 volt DC converter.

4. The device of claim 2 further including ports for side speakers and a microphone.

* * * * *